United States Patent
Kazama et al.

(10) Patent No.: US 11,374,483 B2
(45) Date of Patent: Jun. 28, 2022

(54) DC-DC CONVERTER HAVING A SWITCH ON-TIME CONTROL LOOP WITH A SWITCHED-CAPACITOR CIRCUIT FOR ERROR-BASED ADJUSTMENT

(71) Applicant: TEXAS INSTRUMENTS INCORPORATED, Dallas, TX (US)

(72) Inventors: Taisuke Kazama, Plano, TX (US); Masahiro Yoshioka, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/014,881

(22) Filed: Sep. 8, 2020

(65) Prior Publication Data

US 2020/0403492 A1 Dec. 24, 2020

Related U.S. Application Data

(62) Division of application No. 16/175,026, filed on Oct. 30, 2018, now Pat. No. 10,770,963.

(51) Int. Cl.
*H02M 3/158* (2006.01)
*H02M 1/08* (2006.01)
*H02M 1/00* (2006.01)

(52) U.S. Cl.
CPC ............ *H02M 1/08* (2013.01); *H02M 3/158* (2013.01); *H02M 1/0025* (2021.05)

(58) Field of Classification Search
CPC ......... H02M 2001/0025; H02M 3/156; H02M 3/157; H02M 3/158; H02M 1/0025
See application file for complete search history.

(56) References Cited

U.S. PATENT DOCUMENTS

| | | | |
|---|---|---|---|
| 9,160,229 B2 | 10/2015 | Fan et al. | |
| 2008/0042633 A1* | 2/2008 | Klein | H02M 3/158 |
| | | | 323/288 |
| 2009/0009148 A1 | 1/2009 | Philbrick | |
| 2013/0049711 A1* | 2/2013 | Mirea | H02M 3/1563 |
| | | | 323/234 |
| 2015/0067358 A1 | 3/2015 | Philbrick et al. | |
| 2016/0028309 A1* | 1/2016 | Miyazaki | H02M 3/158 |
| | | | 323/271 |
| 2017/0288537 A1 | 10/2017 | Jing et al. | |
| 2018/0337599 A1 | 11/2018 | Chen et al. | |

* cited by examiner

*Primary Examiner* — Harry R Behm
(74) *Attorney, Agent, or Firm* — Valerie M. Davis; Charles A. Brill; Frank D. Cimino

(57) ABSTRACT

An apparatus includes a direct-current to direct-current (DC-DC) converter having an output terminal and at least one electronic switch. The DC-DC converter also includes: 1) a first feedback loop configured to control a voltage at the output terminal by adjusting a first switching parameter of the at least one electronic switch; and 2) a second feedback loop configured to adjust a second switching parameter of the at least one electronic switch. The second feedback loop includes a switched-capacitor circuit configured to determine a threshold signal based on an error between a reference signal and a control signal for the at least one electronic switch. The second feedback loop is configured to adjust the second switching parameter based on a comparison of an on-time signal with the threshold signal.

20 Claims, 6 Drawing Sheets

DC-DC CONVERTER HAVING A SWITCH ON-TIME CONTROL LOOP WITH A SWITCHED-CAPACITOR CIRCUIT FOR ERROR-BASED ADJUSTMENT

CROSS-REFERENCE TO RELATED APPLICATION

This application is a divisional of U.S. patent application Ser. No. 16/175,026 filed Oct. 30, 2018, which is incorporated herein by reference.

BACKGROUND

Power supplies and power converters are used in a variety of electronic systems. Electrical power is generally transmitted over long distances as an alternating current (AC) signal. The AC signal is divided and metered as desired for each business or home location. As desired, the AC signal is converted to direct current (DC) for use with individual electronic devices or components. Modern electronic systems often employ devices or components designed to operate using different DC voltages. Accordingly, different DC-DC converters, or a DC-DC converter that supports a wide range of output voltages, are needed for such systems. There are many different DC-DC converter topologies. The available DC-DC converter topologies differ with regard to the components used, the amount of power handled, the input voltage(s), the output voltage(s), efficiency, reliability, size, cost and/or other characteristics.

One existing DC-DC converter topology uses a feedback circuit to adjust the amount of power provided to the converter output node based on a variable load. Due to imperfections of components and/or variance in electrical system design (a DC-DC converter is part of a larger electrical system) some converter output voltage ripple is common. The converter output voltage ripple adds noise in an electrical system. In the existing DC-DC converter topology, the converter output voltage ripple has a variable frequency that is not easily filtered from an electrical system.

SUMMARY

In accordance with at least one example, an apparatus comprises a direct-current to direct-current (DC-DC) converter that has an output terminal and at least one electronic switch. The DC-DC converter also comprises: (a) a first feedback loop configured to control a voltage at the output terminal by adjusting a first switching parameter of the at least one electronic switch; and (b) a second feedback loop configured to adjust a second switching parameter of the at least one electronic switch. The second feedback loop includes a switched-capacitor circuit configured to determine a threshold signal based on an error between a reference signal and a control signal for the at least one electronic switch, and wherein the second feedback loop is configured to adjust the second switching parameter based on a comparison of an on-time signal with the threshold signal.

In accordance with at least one example, a DC-DC converter device comprises an output terminal and at least one switch. The DC-DC converter device also comprises a first feedback loop with a first comparator configured to provide a first comparator output based on a comparison of the voltage at the output terminal and a reference voltage, wherein the first feedback loop is configured to adjust a first switching parameter of the at least one electronic switch based on the first comparator output. The DC-DC converter device also comprises a second feedback loop with a second comparator and a switched-capacitor circuit, wherein the switched-capacitor circuit is configured to provide a threshold signal based on an error between a reference signal and a pulse width modulation (PWM) signal. The second comparator is configured to provide a second comparator output based on a comparison of an on-time signal related to the at least one switch and the threshold signal. The second feedback loop is configured to adjust a second switching parameter of the at least one electronic switch based on the second comparator output.

In accordance with at least one example, a DC-DC converter circuit comprises an output terminal between a first switch and a second switch. The DC-DC converter circuit also comprises an output inductor having a first side and a second side, wherein the first side of the output inductor couples to the output terminal. The DC-DC converter circuit also comprises an output capacitor having a first side and a second side, wherein the first side of the output capacitor couples to the second side of the output inductor, and wherein the second side of the output capacitor couples to a ground terminal. The DC-DC converter circuit also comprises driver circuitry coupled to the first and second switches. The DC-DC converter circuit also comprises PWM logic coupled to the driver circuitry. The DC-DC converter circuit also comprises a first comparator with an input terminal coupled to the first side of the output capacitor, with a reference terminal coupled to a reference signal terminal, and with an output terminal coupled to a first input terminal of the PWM logic. The DC-DC converter circuit also comprises a frequency-locked loop (FLL) with a switched-capacitor circuit, wherein a first input terminal of the FLL couples to the first side of the output capacitor, a second input terminal of the FLL couples to a reference clock terminal, a third input terminal of the FLL couples to an output terminal of the PWM logic. The DC-DC converter circuit also comprises a second comparator with an input terminal coupled to an output terminal of the FLL, with a reference terminal coupled to on-time signal circuit, and with an output terminal coupled to a second input terminal of the PWM logic.

DETAILED DESCRIPTION OF EXAMPLE EMBODIMENTS

Figure 1A:
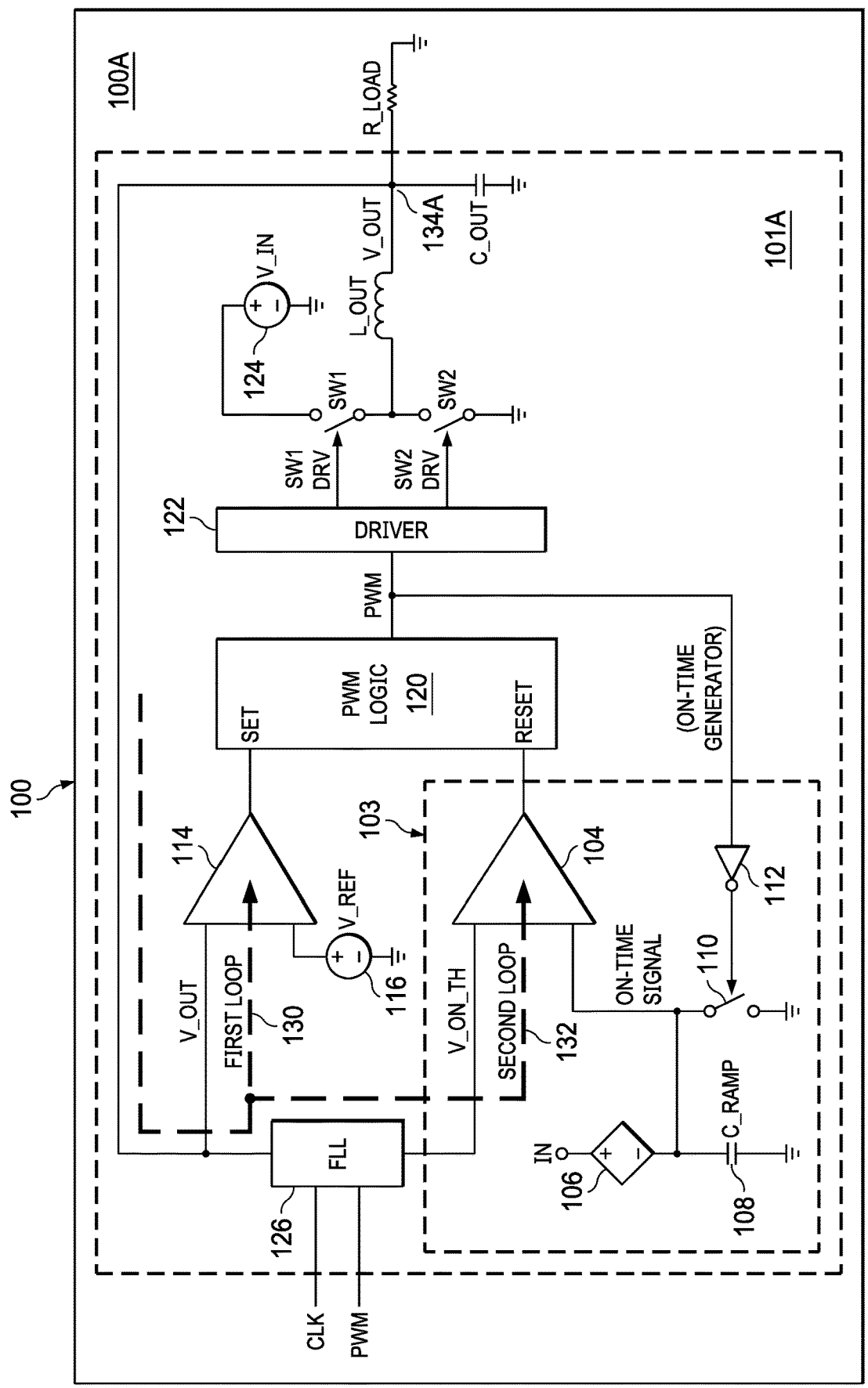
FIGS. 1A-1B illustrate electrical devices in accordance with various examples.

Disclosed herein are direct-current to direct-current (DC-DC) converter topologies having a switch on-time control loop with a switched-capacitor circuit for error-based adjustment. In at least some examples, the switched-capacitor circuit determines an error between a reference signal (e.g., a reference clock) and a switch's control signal (e.g., a pulse width modulation signal). The switched-capacitor circuit adjusts a threshold used by the switch on-time control loop based on the error. Use of the switched-capacitor circuit in this manner results in the DC-DC converter with a stable output node voltage ripple that can be more easily filtered compared to other DC-DC converter topologies with on-time control loops. In different examples, the disclosed DC-DC converter topologies correspond to part or all of an integrated circuit or chip. An example DC-DC converter device with the disclosed DC-DC converter topology is used to provide power to a variable load, where the frequency and frequency variance of the output node voltage ripple tend to vary for different V_IN, V_OUT, and output load (due to the efficiency of the DC-DC converter varying for different V_IN, V_OUT and output loads). As an example, the frequency variance will be approximately 1-3% for low frequency operations such as 200 kHz. For higher frequency operations with a high conversion ratio of V_IN/V_OUT, the frequency variance will be approximately 10-30%. The output load also contributes to frequency variance (in addition to the conversion ratio V_IN/V_OUT), since the converter efficiency goes down with higher output load.

In one example, an electrical device (e.g., an integrated circuit, a chip, a multi-die module, components on a printed circuit board, and/or other device) comprises a DC-DC converter having an output node and at least one electronic switch. The DC-DC converter also includes a first feedback loop configured to control a voltage at the output node by adjusting a first switching parameter (e.g., a duty cycle) of the at least one electronic switch. In some examples, the first feedback loop includes a first comparator configured to provide a first comparator output based on a comparison of the voltage at the output node and a reference voltage, where the first switching parameter of the at least one electronic switch is adjusted based on the first comparator output. The DC-DC converter also includes a second feedback loop configured to adjust a second switching parameter (e.g., a switching frequency) of the at least one electronic switch, where the second feedback loop includes the switched-capacitor circuit. The switched-capacitor circuit is configured to determine a threshold signal based on an error between a reference signal and a control signal for the at least one electronic switch. The second feedback loop is configured to adjust the second switching parameter based on a comparison of an on-time signal with the threshold signal. In some examples, the second feedback loop includes a second comparator and the switched-capacitor circuit, where the second comparator is configured to provide a second comparator output based on a comparison of the on-time signal related and the threshold signal. The second feedback loop is configured to adjust the second switching parameter of the at least one electronic switch based on the second comparator output.

In different examples, the second feedback loop is configured to adjust the threshold signal such that an average switching frequency applied to the at least one electronic switch equals a target switching frequency (e.g., CLK herein). Also, in some examples, the switched-capacitor circuit comprises a differential integrator and a summer circuit configured to adjust the threshold signal based on the error. In some examples, an RC filter at the output of the summer circuit eliminates noise generated at the differential integrator, where the output of the RC filter corresponds to the threshold signal. To provide a better understanding, various DC-DC converter options, assembly switched-capacitor circuit options, and scenarios are described using the figures as follows.

Figure 1B:
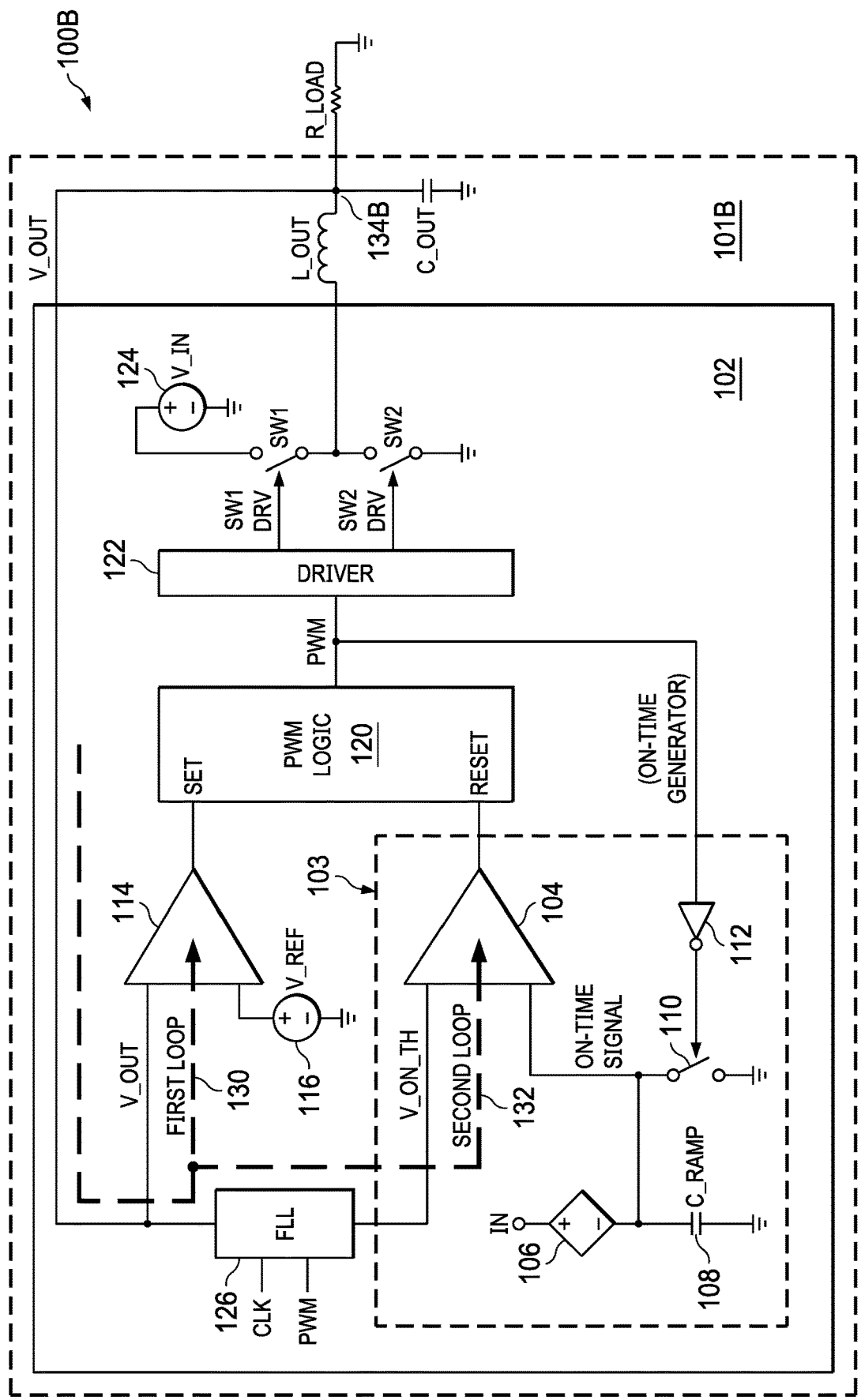

FIGS. 1A-1B illustrate electrical devices in accordance with various examples. In FIG. 1A, the electrical device 100A represents an integrated circuit, a chip, a multi-die module, components on a printed circuit board and/or other device. As shown, the electrical device 100A includes a DC-DC converter 101A with a first switch (SW1) and a second switch (SW2), where SW1 couples to a voltage source node 124 that supplies an input voltage source (V_IN) and where SW2 couples to a ground node. When SW1 is closed (while SW2 is open), V_IN pulls up the output voltage (V_OUT) at the output node 134A by conducting a current through the output inductor (L_OUT). When SW2 is closed (while SW1 is open), the ground node pulls down the output voltage V_OUT at the output node 134A by sinking a current through L_OUT. V_OUT is established across an output capacitor (C_OUT) and is available for use by a variable load (R_LOAD).

V_OUT is also provide to a first feedback loop 130. The first feedback loop 130 is configured to adjust a first switching parameter of SW1. In some examples, the first switching parameter is the duty cycle of a PWM signal used to drive SW1. As shown, the first feedback loop 130 includes a first comparator 114 that compares V_OUT with a reference voltage (V_REF) provided by a voltage source node 116. The output of the first comparator 114 is provided to PWM logic 120, which generates a PWM signal. The PWM signal is provided to driver circuitry 122, which generates controls signals (labeled SW1 DRV and SW2 DRV) for SW1 and SW2. In some examples, the first feedback loop 130 enables PWM duty cycle adjustments based on V_OUT. In the example of FIG. 1A, the first comparator 114, the voltage source 116, the PWM logic 120, and the driver 122 are components of a first feedback circuit corresponding to the first feedback loop 130 used to drive SW1 of the DC-DC converter 101. In some examples, the first feedback loop 130 enables adjustments to the duty cycle of SW1 based on a comparison of V_OUT and a reference signal (V_REF).

V_OUT is also provided to a second feedback loop 132. The second feedback loop 130 is configured to adjust a second switching parameter of SW1. In some examples, the second switching parameter is the switching frequency of a PWM signal used to drive SW1. As shown, the second feedback loop 132 includes an on-time generator circuit 103 with a second comparator 104 that compares an on-time signal with a threshold signal (labeled V_ON_TH). The on-time signal is a function of the PWM signal output from the PWM Logic 120. More specifically, the on-time generator circuit 104 includes an inverter 112, a switch 110, a capacitor 108, and a voltage source 106, which are used to generate the on-time signal. Meanwhile, V_ON_TH is provided by a frequency-locked loop (FLL) 126 included with the second feedback loop 132. The FLL 126 uses V_OUT, a reference clock (CLK) and the PWM signal to provide the V_ON_TH signal to the second comparator 104 of the on-time generator circuit 104.

In at least some examples, the FLL 126 employs a switched-capacitor circuit to provide V_ON_TH as described herein. The output of the second comparator 104 is used by the PWM logic 120 to adjust a frequency of the PWM signal output to the driver circuitry 122. In the example of FIG. 1A, the FLL 126, the on-time generator circuit 103, the PWM logic 120, and the driver 122 are components of a second feedback circuit corresponding to the second feedback loop 132 used to drive SW1 of the DC-DC converter 101A.

In operation, the second feedback loop 132 is slower than first feedback loop 130. In some examples, adjustments to the second switching parameter (e.g., switching frequency) controlled using the second feedback loop 132 occur at 1/10th the speed of adjustment to the first switching parameter (e.g., duty cycle) controlled using the first feedback loop 130. In some examples, the FLL 126 is configured to adjust the V_ON_TH signal such that an average switching frequency applied to at least one electronic switch of a DC-DC converter equals a target switching frequency (e.g., the CLK signal in the example of FIG. 1A or a divided version of the CLK signal).

In FIG. 1B, the electrical device 100B includes a DC-DC converter 101B with an integrated circuit 102 that includes various components introduced in FIG. 1A, including the first comparator 114, the PWM logic 120, the driver circuitry 122, SW1, SW2, the voltage source 124 (or respective node), the FLL 126, and the on-time generator circuitry 103. Other components of the DC-DC converter 101B (e.g., L_OUT and C_OUT) are external to the integrated circuit 102. As an example, the integrated circuit 102 is selected by designers to complete the electrical device 100B, where the integrated circuit 102 provides power to R_LOAD. In other respects, the operations for the electrical device 100B follows the discussion provided for the electrical device 100A of FIG. 1A.

Figure 2A:
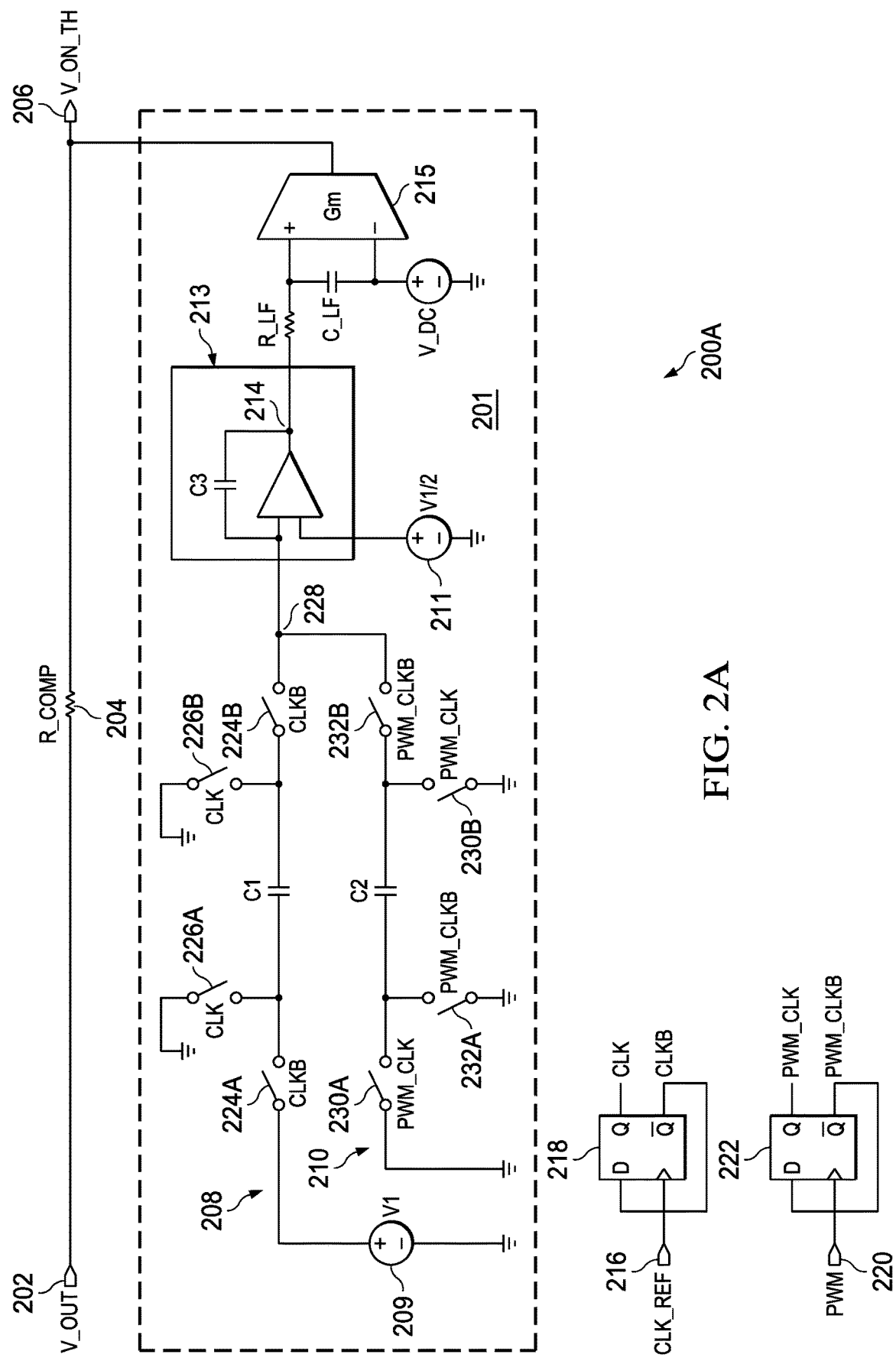
FIGS. 2A-2B illustrate switched-capacitor circuits in accordance with various examples.
Figure 2B:
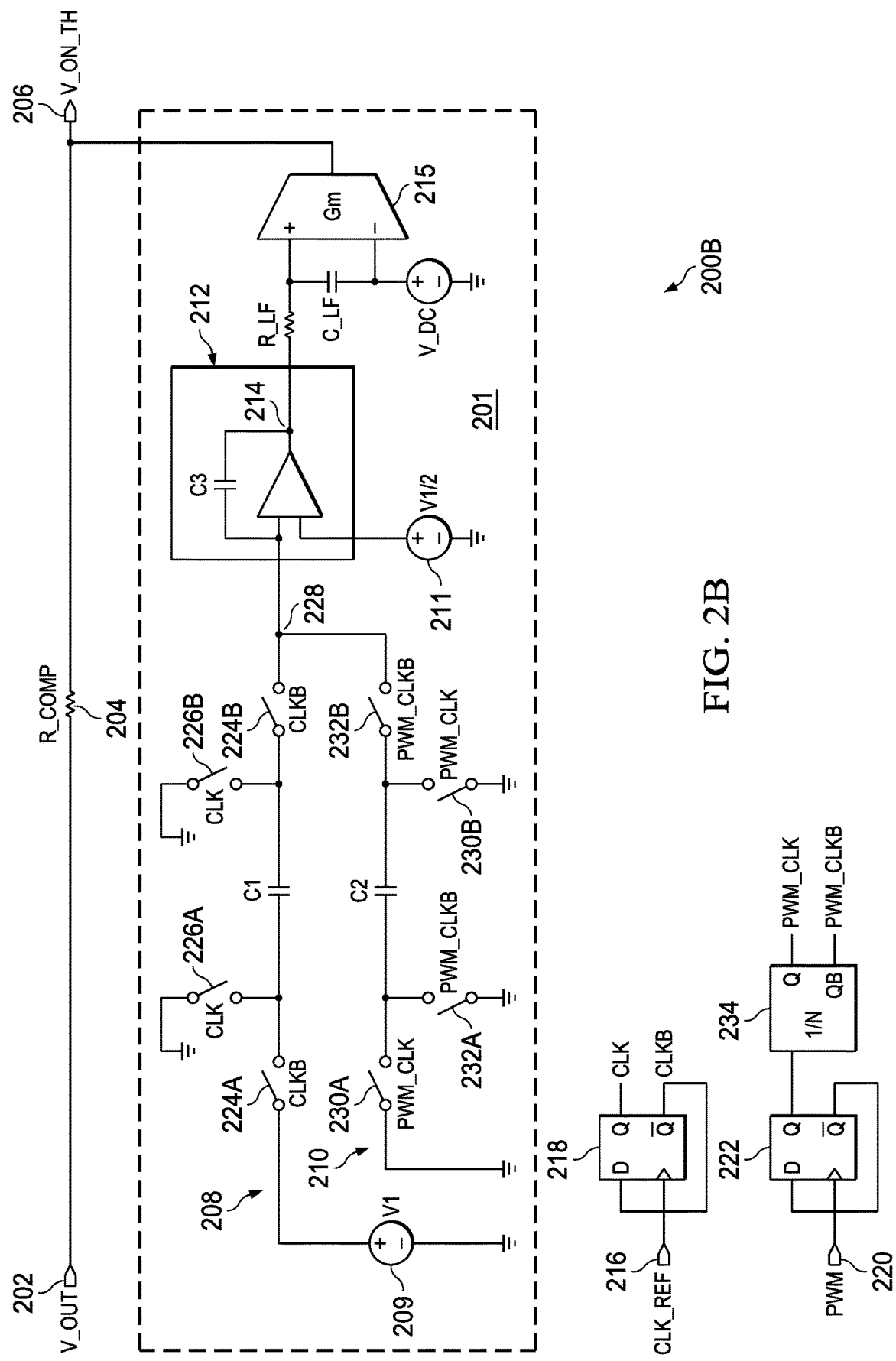

FIGS. 2A-2B illustrate switched-capacitor circuits 200A and 200B in accordance with various examples. The switched-capacitor circuits 200A and 200B are examples of the FLL 126 in FIG. 1, which was described as providing the V_ON_TH signal based on V_OUT, the CLK signal, and the control signal (e.g., a PWM signal) to drive SW1. As shown in FIG. 2A, the switched-capacitor circuit 200A includes a V_OUT node 202 that receives a V_OUT signal for a DC-DC converter such as the DC-DC converter 101A of FIG. 1A or the-DC converter 101B of FIG. 1B. The V_ON_TH signal is a function of a voltage drop of V_OUT across a resistor 204 (labeled R_COMP) combined with an error adjustment from an error adjustment circuit 201, where the V_ON_TH signal is output from the switched-capacitor circuit 200A by the V_ON_TH node 206 (e.g., for use by the second comparator 104 in FIGS. 1A and 1B).

The error adjustment circuit 201 includes a first switched-capacitor branch 208 and a second switched-capacitor branch 210. The first switched-capacitor branch 208 converts the CLK signal to a first current value by selectively coupling a first capacitor (C1) to a voltage source node 209, a ground node, or an integrator circuit 213 using various switches 224A, 224B, 226A, 226B. In the example of FIG. 2A, switch 224A selectively couples a first side of C1 to a voltage source 209 (or related node) and switch 224B selectively couples a second side of C1 to the integrator circuit 213. Also, switch 226A selectively couples a first side of C1 to a ground node and switch 224B selectively couples a second side of C1 to a ground node. More specifically, the switches 224A and 224B (e.g., a first switch and a fourth switch of the first switched-capacitor branch 208) are operated based on the inverse of the CLK signal (labeled CLKB and received from a respective node), while the switches 226A and 226B (e.g., a second switch and a third switch of the first switched-capacitor branch 208) are operated based on the CLK signal received from a respective node. In the example of FIG. 2A, the CLK signal and the CLKB signal are provided by logic 218 based on reference clock signal (CLK_REF). The first current value provided by the first switched-capacitor branch 208 is provided to node 228, where the first current value from the first switched-capacitor branch 208 is combined with a second current value provided from the second switched-capacitor branch 210 to determine an error signal to the integrator circuit 213. The error signal is the error between the CLK_REF signal and the PWM signal.

The second switched-capacitor branch 210 converts the PWM signal to the second current value by selectively coupling a second capacitor (C2) to a ground node or to the integrator circuit 213 using various switches 230A, 230B, 232A, 232B. In the example of FIG. 2A, switch 230A selectively couples a first side of C2 to a ground node and switch 230B selectively couples a second side of C2 to a ground node. Also, switch 232A selectively couples a first side of C2 to a ground node and switch 232B selectively couples a second side of C2 to the integrator circuit 213. More specifically, the switches 230A and 230B (e.g., a first and third switch of the second switched-capacitor branch 210) are operated based on the PWM_CLK signal. Also, the switches 232A and 232B (e.g., a second and fourth switch of the second switched-capacitor branch 210) are operated based on the inverse of the PWM_CLK signal (PWM_CLKB). In the example of FIG. 2A, the PWM_CLK signal and the PWM_CLKB signal are provided by logic 222 (or respective nodes) based on the PWM signal received via a PWM node 220. The second current value provided by the second switched-capacitor branch 210 is provided to node 228. The first current value provided by the first switched-capacitor branch 208 is combined with the second current value provided by the second switched-capacitor branch 210 to determine the error signal. In some examples, the error signal at node 228 is the error between the CLK_REF signal and the PWM signal. This error signal is provided to a differential integrator 212 (e.g., an operational amplifier with a capacitor, C3, in the feedback path). The differential integrator 212 also receives a reference voltage from a voltage source node 211. In some examples, the voltage level provided by the voltage source node 211 is half the voltage level provided by the voltage source node 209.

In some examples, the first and second switched-capacitor branches 208 and 210 are configured to generate a positive current as the error when the CLK_REF signal has a higher frequency than the PWM signal. Also, the first and second switched-capacitor branches 208 and 210 are configured to generate a negative current as the error when the CLK_REF has a lower frequency than the PWM signal. The error is input to the differential integrator comprising an operational amplifier. The operational amplifier include a feedback loop having a third capacitor that integrates the error over time.

In some examples, the output of the differential integrator 212 is provided to node 214. As shown, a resistor-capacitor (RC) filter with R_LF and C_LF couples to the node 214. The RC filter eliminates noise generated at the differential integrator 212. The output of the RC filter corresponds to the V_ON_TH signal. In some examples, the error adjustment circuit 201 includes a transconductance boost circuit 215 after the RC filter. The transconductance boost circuit 215 and R_COMP 204 operate as a summer circuit. In operation, the voltage across C_LF will be added between V_OUT and V_ON_TH.

The switched-capacitor circuit 200B of FIG. 2B is the same as the switched-capacitor circuit 200A of FIG. 2A, except that a clock divider 234 is included at the output of the logic 222. With the switched-capacitor circuit 200B of FIG. 2B, PWM_CLK and PWM_CLKB (used with the second switched-capacitor branch 210) are at lower frequencies by a factor of 1/N relative to the PWM signal. In such examples, the second feedback loop 132 is configured to lock the PWM signal to a frequency that is multiple times higher than CLK_REF. In other examples, a clock divider is used for the CLK_REF signal such that CLK and CLKB are at lower frequencies by a factor of 1/N relative to the CLK_REF signal. In such examples, the PWM signal locks to the CLK signal. Regardless of whether a clock divider is used with the CLK_REF signal or PWM signal, the switched-capacitor circuits 200A and 200B of FIGS. 2A and 2B support automatic tuning of an integration time constant for compatibility with different CLK_REF frequencies.

Various options and/or values for the switched-capacitor circuits 200A and 200B discussed for FIGS. 2A and 2B are now given. In some examples, the CLK_REF and PWM signals are converted to a 50% duty pulse in front of a switched-capacitor integrator (e.g., formed by the switched-capacitor branches 208 and 210 and differential integrator 212). In one example, the CLK_REF signal frequency is converted into a positive current given as $I_{CLK}=C1*V1*F_{CLK}/4$. Meanwhile, the PWM signal frequency is converted into a negative current given as $I_{PWM}=-C2*V1*F_{PWM}/4$. In some examples, C1 and C2 are the same. Also, in some examples, the values of C1, C2, and C3 are selected to support automatic tuning of an integration time constant for compatibility with different reference signal frequencies. When $F_{CLK}>F_{PWM}$, positive current accumulate into C3 resulting in the V_ON_TH signal being lower than the V_OUT signal, such that the on-time for SW1 (see FIGS. 1A and 1B) is decreased and $F_{PWM}$ is increased. When $F_{CLK}<F_{PWM}$, negative current accumulates into C3 resulting in the V_ON_TH signal being higher than the V_OUT signal, such that the on-time for SW1 is increased and $F_{PWM}$ is decreased. At steady state, $I_{CLK}=I_{PWM}$ and $F_{PWM}=F_{CLK}$.

In some examples, the FLL accuracy for the switched-capacitor circuits 200A and 200B depends only on capacitance mismatch (e.g., a mismatch of C1 and C2), assuming low frequency and V1/2>>integrator offset. As desired, the integrator offset can be cancelled by applying chopping on the differential integrator 212 with PWM_CLK. For higher CLK signal frequencies, a divider (e.g., divider 234) is used to minimize the switching induced error like charge injection. In some examples, the integrator pole for the differential integrator 212 is given as:

$$F_p = \frac{I_{CLK}}{2\pi C_3} = \frac{F_{CLK}}{8\pi} \frac{C_1}{C_3}.$$

In some examples, this $F_p$ will be placed at 1/10 of an on-time controlled buck regulator's crossover frequency $F_C$ (proportional to $F_{CLK}$) for stability reasons. Because the integrator pole, $F_p$, and overall loop crossover frequency are proportional to $F_{CLK}$, there is no need to tweak this circuit for different switching frequencies. In some examples, for higher CLK_REF frequencies, a frequency divider (e.g., divider 132) is applied to minimize charge injection error and non-overlapping clock induced error. The frequency divider enables use of a low frequency clock, which improves precision and allows use of a smaller ratio of C1/C3 (where C1=C2).

Figure 3B:
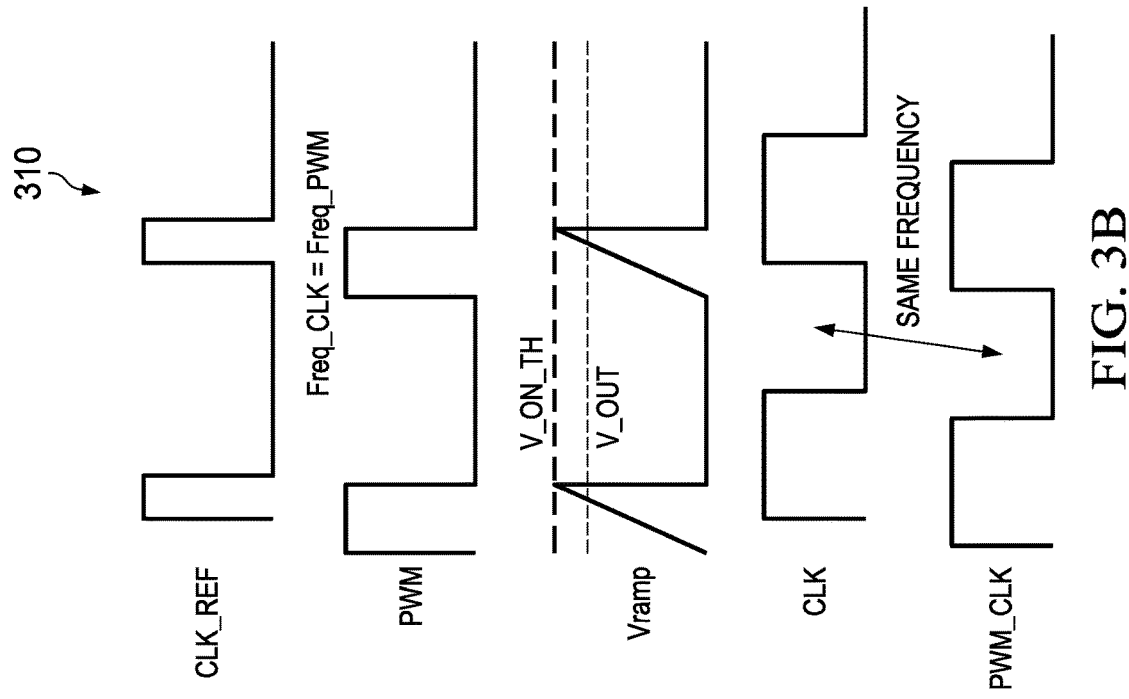
FIGS. 3A-3B illustrate timing diagrams for a direct-current to direct-current (DC-DC) converter in accordance with various examples.
Figure 3A:
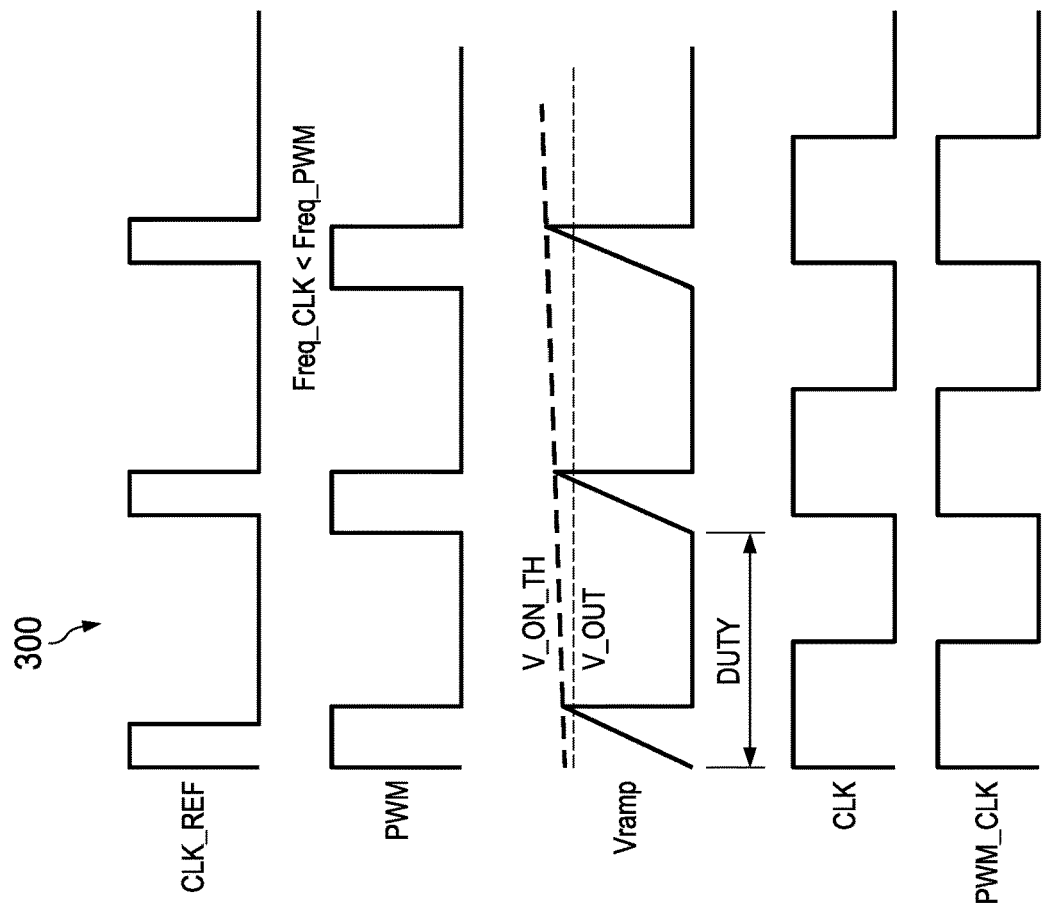

FIGS. 3A-3B illustrate timing diagrams 300 and 310 for a DC-DC converter in accordance with various examples. In the timing diagram 300 of FIG. 3A, example signals for the CLK_REF signal, the PWM signal, the CLK signal, and the PWM_CLK signal introduced in FIGS. 2A and 2B are represented for a scenario where the CLK signal frequency (Freq_CLK) is less than the PWM signal frequency (Freq_PWM). The timing diagram 300 also shows an example Vramp signal (the voltage on C RAMP 108).

During operations, V_ON_TH (the reference voltage for the comparator of the on-time signal generator) is updated base on Vramp. More specifically, the FLL 126 increases/decreases V_ON_TH based on V_OUT, resulting in the on-time being adjusted to obtain a desired switching frequency. In some examples, the CLK signal in FIGS. 3A and 3B is a divided version of the CLK_REF signal (the target frequency) and the PWM_CLK signal is a divided version of the PWM signal. In some examples, the PWM signal has a 50% duty cycle. As shown in FIGS. 3A and 3B, the Vramp duty cycle is the same as the PWM signal. When the PWM signal is high, the Vramp signal ramps up. On the other hand, when the PWM signal is low, the Vramp signal is discharged. When the Vramp signal reaches V_ON_TH, the PWM signal is terminated.

In the timing diagram 310 of FIG. 3B, example signals for the CLK_REF signal, the PWM signal, the CLK signal, and the PWM_CLK signal introduced in FIGS. 2A and 2B are represented for a steady state scenario where the frequency of the CLK signal is the same the frequency of the PWM signal. The timing diagram 310 also shows an example Vramp signal. For the timing diagram 310, the frequency of the CLK signal is the same as the frequency of the PWM signal (the charge current or discharge current into C3 of FIG. 2B is equal). Therefore, there is no voltage variation for V_ON_TH, which provides a fixed frequency in steady-state.

Figure 4:
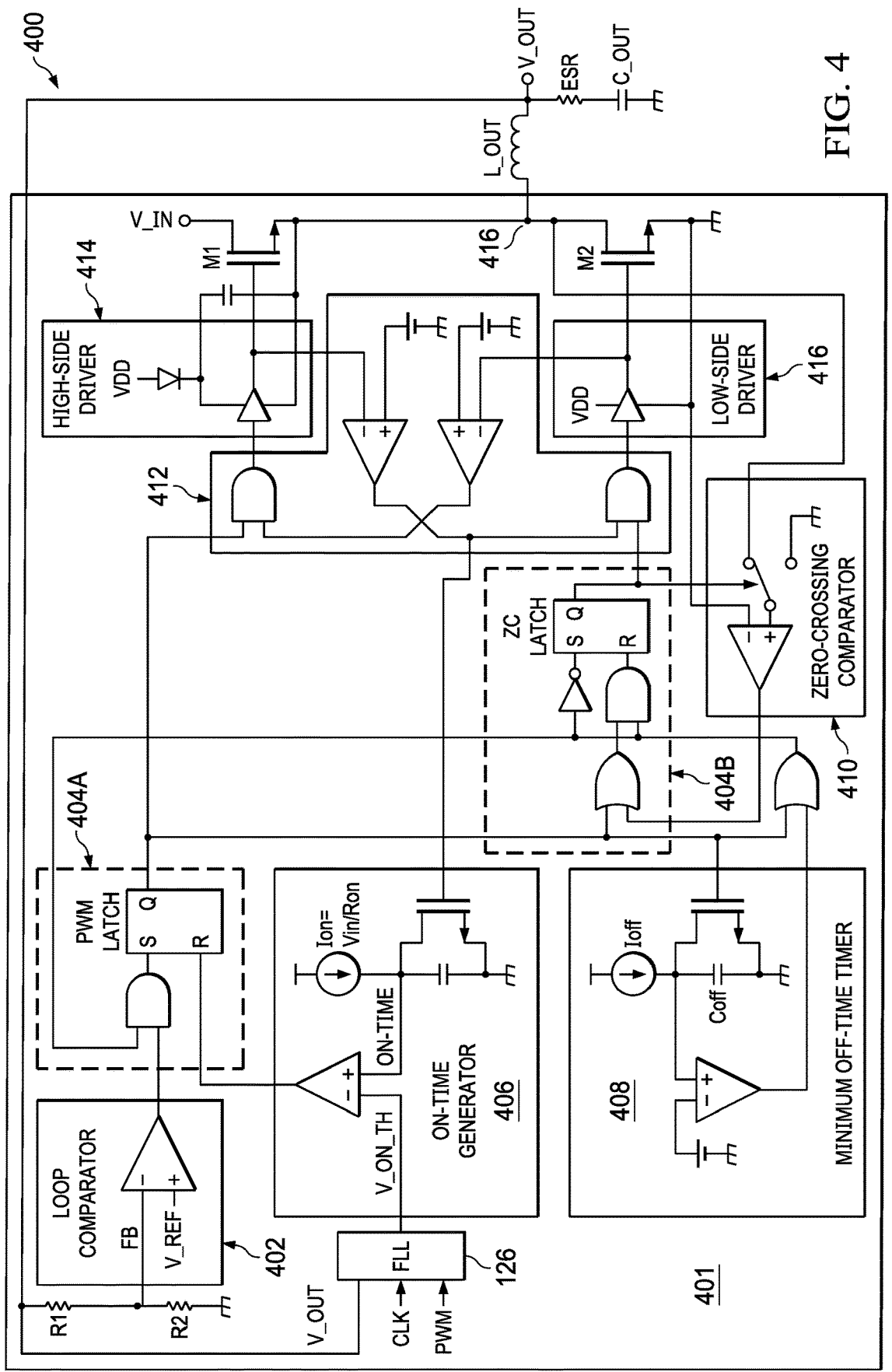
FIG. 4 illustrates another electrical device in accordance with various examples.

FIG. 4 illustrates another electrical device 400 (e.g., an integrated circuit, a chip, a multi-die module, components on a printed circuit board, and/or other device) in accordance with various examples. The electrical device 400 includes an integrated circuit 401 with various DC-DC converter components including the FLL 126 described previously. The integrated circuit 401 also includes a first comparator 402, latch logic 404A (e.g., with a PWM latch), cross-conduction control logic 412, and high-side driver 414, where these components correspond to a first feedback loop (comparable to the first feedback loop 130 in FIGS. 1A and 1B). In some examples, the first control loop controls a first switching parameter (e.g., the duty cycle) for the high-side switch (a transistor, M1). In some examples, a voltage divider formed using resistors R1 and R2 is used to reduce V_OUT to another voltage level to be input to the comparator 402 and compared with V_REF. Meanwhile, the FLL 126, an on-time generator circuit 406, the cross-conduction control logic 412, and the high-side driver 414 correspond to a second feedback loop (comparable to the second feedback loop 132 in FIGS. 1A and 1B) for M1. As shown, the on-time generator circuit 406 includes a second comparator, which compares the V_ON_TH signal (a voltage reference for the comparator of the on-time generator circuit 406) provided by the FLL 126 with an on-time signal provided by circuitry of the on-time generator circuit 406. The integrated circuit 401 of FIG. 4 also includes a low-side driver 410 and a low-side switch (a transistor, M2). To complete the electrical device 400, an output node 416 of the integrated circuit 401 couples to an output inductor (L_OUT) and an output capacitor (C_OUT), which are external components in at least some examples. As desired, the electrical device 400 couples to a variable load (not shown).

In some examples, the electrical device 400 includes other circuitry such as a minimum off-time timer circuit 408, latch logic 404B (e.g., with a zero-crossing latch), and a zero-crossing comparator 410. In operation, the minimum off-time timer circuit 408, the latch logic 404B, and the zero-crossing comparator 410 determine when the low-side driver 416 provides a drive signal to M2. In other examples, the minimum off-time timer circuit 408, the latch logic 404B, and the zero-crossing comparator 410 are omitted and/or the circuitry for directing the low-side driver 416 varies from the example of FIG. 4.

In some examples, the disclosed DC-DC converter topologies (e.g., the DC-DC converter 101A of FIG. 1A, the DC-DC converter 101B of FIG. 1B, or the integrated circuit 401) are advantageous over other DC-DC converter topologies due to a single integrator (e.g., integrator 213 in FIGS. 2A and 2B) being used to lock the adaptive on-time control to a target switching frequency (e.g., the CLK signal herein). Also, the accuracy of the FLL 126 with a switched-capacitor circuit (e.g., circuit 200A or 200B in FIGS. 2A and 2B) is a function of how closely C1 matches C2. Because capacitor matching processes are fairly accurate, the accuracy of the FLL 126 is expected to be high. Also, the time constant of the integrator (e.g., integrator 213 in FIGS. 2A and 2B) scales with the target switching frequency (e.g., the CLK signal herein). Accordingly, the integrator time constant does not need any adjustment for different frequency operations. As desired, the FLL 126 can be applied to high frequency system by adding a frequency divider (e.g., divider 234 in FIG. 2B).

Certain terms have been used throughout this description and claims to refer to particular system components. This document does not intend to distinguish between components that differ only in name but not in their respective functions or structures. In this disclosure and claims, the terms "including" and "comprising" are used in an open-ended fashion, and thus should be interpreted to mean "including, but not limited to . . . ." The recitation "based on" is intended to mean "based at least in part on." Therefore, if X is based on Y, X may be a function of Y and any number of other factors.

Modifications are possible in the described examples, and other implementations are possible, within the scope of the claims.

What is claimed is:

1. A circuit, comprising:
a first switching transistor having a control terminal and a terminal;
a second switching transistor having a respective control terminal and a respective terminal coupled to the terminal of the first switching transistor;
an inductor having first and second terminals, its first terminal coupled to the terminals of the first and second switching transistors;
a capacitor having a respective first terminal coupled to the second terminal of the inductor;
driver circuitry having an input and an output, its output coupled to the control terminals of the first and second switching transistors;
a pulse width modulation (PWM) circuit having first and second inputs and a respective output, its output coupled to the input of the driver circuitry;
a first comparator having a respective input and a respective output, its input coupled to the second terminal of the inductor, its output coupled to the first input of the PWM circuit;
a frequency-locked loop (FLL) having respective first and second inputs, a clock input, and an output, its first input coupled to the second terminal of the inductor, its second input coupled to the output of the PWM circuit, the FLL including a switched capacitor circuit coupled to an integrator circuit; and a second comparator having a respective input and a respective output, its input coupled to the output of the FLL, its output coupled to the second input of the PWM circuit.

2. The circuit of claim 1, wherein:
the switched-capacitor circuit includes first and second branches;
the first branch includes a second capacitor having respective first and second terminals, its first terminal coupled to a voltage source terminal via a first switch and coupled to a ground terminal via a second switch, its second terminal coupled to the ground terminal via a third switch and coupled to an input of the integrator circuit via a fourth switch, the second and third switches are coupled to a first control signal terminal, and the first and fourth switches are coupled to a second control signal terminal; and
the second branch includes a third capacitor having respective first and second terminals, its first terminal coupled to the ground terminal via a fifth switch and coupled to the ground terminal via a sixth switch, its second terminal coupled to the ground terminal via a seventh switch and coupled to the input of the integrator circuit via an eighth switch, the sixth and eighth switches are coupled to a third control signal terminal, and the fifth and seventh switches are coupled to a fourth control signal terminal.

3. The circuit of claim 1, wherein the switched capacitor circuit includes:
a second capacitor and first switches coupled to a respective input of the integrator circuit, in which the first switches are configured to close responsive to a clock signal at the clock input;
a third capacitor and second switches coupled to the input of the integrator circuit, in which the second switches are configured to close responsive to a PWM signal from the PWM circuit.

4. The circuit of claim 1, wherein the FLL includes:
a filter circuit coupled to an output of the integrator circuit; and
a summer circuit coupled to the filter circuit, the second terminal of the inductor, and the input of the second comparator.

5. The circuit of claim 4, wherein:
the filter circuit includes:
a first resistor having respective first and second terminals, its first terminal coupled to the output of the integrator circuit; and
a second capacitor having respective first and second terminals, its first terminal coupled to the second terminal of the first resistor; and
the summer circuit includes:
a transconductance circuit having inputs and a respective output, its inputs coupled to the first and second terminals of the second capacitor, its output coupled to the input of the second comparator; and
a second resistor coupled between the second terminal of the inductor and the input of the second comparator.

6. The circuit of claim 1, further comprising an on-time generator, including:
the second comparator having a respective second input;
a voltage source having a respective terminal coupled to the second input of the second comparator;
a second capacitor having a respective terminal coupled to the second input of the second comparator;

an inverter having an input and an output, its input coupled to the output of the PWM circuit; and a switch coupled to the output of the inverter and to the second input of the second comparator.

7. The circuit of claim 1, further comprising an on-time generator, including:

the second comparator having a respective second input;

a current source having a respective terminal coupled to the second input of the second comparator;

a transistor having respective first and second terminals, its first terminal coupled to the second input of the second comparator; and a second capacitor coupled between the first and second terminals of the transistor.

8. A circuit comprising:

a pulse width modulation (PWM) circuit having first and second inputs and an output;

a first comparator having a feedback input, a reference input and a respective output, its output coupled to the first input of the PWM circuit;

a frequency-locked loop (FLL) having a respective feedback input, a clock input, a third input and a respective output, its third input coupled to the output of the PWM circuit, the FLL including a switched capacitor circuit and an integrator circuit having a respective input, the switched capacitor circuit including:

a first capacitor and first switches coupled to the input of the integrator circuit, in which the first switches are configured to close responsive to a clock signal at the clock input;

a second capacitor and second switches coupled to the input of the integrator circuit, in which the second switches are configured to close responsive to a PWM signal from the PWM circuit; and a second comparator having a respective input and a respective output, its input coupled to the output of the FLL, its output coupled to the second input of the PWM circuit.

9. The circuit of claim 8, wherein the FLL includes:

a filter circuit coupled to an output of the integrator circuit; and a summer circuit coupled to the filter circuit and the input of the second comparator.

10. The circuit of claim 9, wherein:

the filter circuit includes:

a first resistor having respective first and second terminals, its first terminal coupled to the output of the integrator circuit; and a capacitor having respective first and second terminals, its first terminal coupled to the second terminal of the first resistor; and the summer circuit includes:

a transconductance circuit having inputs and a respective output, its inputs coupled to the first and second terminals of the capacitor, its output coupled to the input of the second comparator; and a second resistor having a respective terminal coupled to the input of the second comparator.

11. The circuit of claim 8, further comprising an on-time generator, including:

the second comparator having a respective second input;

a voltage source having a respective terminal coupled to the second input of the second comparator;

a capacitor having a respective terminal coupled to the second input of the second comparator;

an inverter having an input and an output, its input coupled to the output of the PWM circuit; and a switch coupled to the output of the inverter and to the second input of the second comparator.

12. The circuit of claim 8, further comprising an on-time generator, including:

the second comparator having a respective second input;

a current source having a respective terminal coupled to the second input of the second comparator;

a transistor having respective first and second terminals, its first terminal coupled to the second input of the second comparator; and a capacitor coupled between the first and second terminals of the transistor.

13. The circuit of claim 8, wherein:

the first capacitor and first switches are configured to provide a first current responsive to the clock signal;

the second capacitor and second switches are configured to provide a second current responsive to the PWM signal; and the FLL circuit is configured to adjust a signal at its output responsive to the first and second currents.

14. A circuit comprising:

a pulse width modulation (PWM) circuit having first and second inputs and an output;

a first comparator having a feedback input, a reference input and a respective output, its output coupled to the first input of the PWM circuit;

a frequency-locked loop (FLL) having a respective feedback input, a clock input, a third input and a respective output, its third input coupled to the output of the PWM circuit, the FLL including a switched capacitor circuit coupled to an integrator circuit; and a second comparator having a respective input and a respective output, its input coupled to the output of the FLL, its output coupled to the second input of the PWM circuit.

15. The circuit of claim 14, wherein the switched capacitor circuit includes:

a first capacitor and first switches coupled to an input of the integrator circuit, in which the first switches are configured to close responsive to a clock signal at the clock input;

a second capacitor and second switches coupled to the input of the integrator circuit, in which the second switches are configured to close responsive to a PWM signal from the PWM circuit.

16. The circuit of claim 15, wherein:

the first capacitor and first switches are configured to provide a first current responsive to the clock signal;

the second capacitor and second switches are configured to provide a second current responsive to the PWM signal; and the FLL circuit is configured to adjust a signal at its output responsive to the first and second currents.

17. The circuit of claim 14, wherein the FLL includes:

a filter circuit coupled to an output of the integrator circuit; and a summer circuit coupled to the filter circuit and the input of the second comparator.

18. The circuit of claim 17, wherein:

the filter circuit includes:

a first resistor having respective first and second terminals, its first terminal coupled to the output of the integrator circuit; and a capacitor having respective first and second terminals, its first terminal coupled to the second terminal of the first resistor; and the summer circuit includes:

a transconductance circuit having inputs and a respective output, its inputs coupled to the first and second terminals of the capacitor, its output coupled to the input of the second comparator; and a second resistor having a respective terminal coupled to the input of the second comparator.

19. The circuit of claim 14, further comprising an on-time generator, including:

the second comparator having a respective second input;

a voltage source having a respective terminal coupled to the second input of the second comparator;

a capacitor having a respective terminal coupled to the second input of the second comparator;

an inverter having an input and an output, its input coupled to the output of the PWM circuit; and a switch coupled to the output of the inverter and to the second input of the second comparator.

20. The circuit of claim 14, further comprising an on-time generator, including:

the second comparator having a respective second input;

a current source having a respective terminal coupled to the second input of the second comparator;

a transistor having respective first and second terminals, its first terminal coupled to the second input of the second comparator; and a capacitor coupled between the first and second terminals of the transistor.

* * * * *